United States Patent
Hsu et al.

[11] Patent Number: 6,100,811
[45] Date of Patent: *Aug. 8, 2000

[54] FINGERPRINT ACTUATION OF CUSTOMIZED VEHICLE FEATURES

[75] Inventors: Shi-Ping Hsu, Pasadena; Bruce W. Evans; Arthur F. Messenger, both of Redondo Beach; Denes L. Zsolnay, Rolling Hills Estates, all of Calif.

[73] Assignee: TRW Inc., Redondo Beach, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/995,564

[22] Filed: Dec. 22, 1997

[51] Int. Cl.[7] ............................................ G06F 7/04
[52] U.S. Cl. ............................ 340/825.31; 340/825.3; 340/825.34; 340/430; 340/539; 340/825.69; 382/115; 382/124; 382/125; 382/126
[58] Field of Search ........................... 340/825.31, 825.3, 340/825.34, 430, 539, 825.69; 382/115, 224, 126, 124, 125

[56] References Cited

U.S. PATENT DOCUMENTS

| | | | |
|---|---|---|---|
| 4,451,887 | 5/1984 | Harada et al. | 364/424 |
| 4,754,255 | 6/1988 | Sanders et al. | 340/430 |
| 4,997,053 | 3/1991 | Drori et al. | 180/287 |
| 5,054,569 | 10/1991 | Scott et al. | 180/167 |
| 5,067,162 | 11/1991 | Driscoll, Jr. et al. | 382/126 |
| 5,559,504 | 9/1996 | Itsumi et al. | 340/825.3 |
| 5,572,597 | 11/1996 | Chang et al. | 382/125 |
| 5,631,971 | 5/1997 | Sparrow | 382/125 |
| 5,802,199 | 9/1998 | Pare, Jr. et al. | 382/115 |

Primary Examiner—Michael Horabik
Assistant Examiner—Yves Dalencourt
Attorney, Agent, or Firm—Michael S. Yatsko

[57] ABSTRACT

Apparatus, and a corresponding method for its use, for gaining access to and operating a vehicle, such as a car (10), by means of at least one fingerprint sensor (16) installed inside the vehicle at a convenient location and, optionally, outside the vehicle (at 14), in or near a door handle (12). Once an authorized user's identify has been verified in a fingerprint matching device (30), various vehicle subsystems are automatically adjusted to the identified user's preferred settings, which are stored in a memory (98). In addition, starting the vehicle engine is enabled if an interior fingerprint sensor has been used, or the vehicle is unlocked if an exterior fingerprint sensor has been used. Vehicle subsystems that are automatically adjusted to the user preferences include seats (38), mirrors (40), steering wheel (42), climate control (44), airbag (52), telephone (46), radio (50) and onboard computer (54), as well as performance control features (48) such as suspension and transmission adjustment. Door locks (34) and security system features (36) are also automatically controlled, as is a radio transmitter (56) that is automatically customized to open the user's home garage door or office parking entry gate. Features of a number of different fingerprints are stored in the device to allow for operation of the vehicle (10) by different family members, as authorized by a primary user.

26 Claims, 7 Drawing Sheets

FINGERPRINT ACTUATION OF CUSTOMIZED VEHICLE FEATURES

BACKGROUND OF THE INVENTION

The present invention relates generally to personal identification or verification systems and, more particularly, to systems that automatically verify a person's identity before granting access to a vehicle. Traditionally, keys and locks, or combination locks, have been used to limit access to property, on the theory that only persons with a right to access the property will have the required key or combination. This traditional approach is, of course, still widely used to limit access to a variety of enclosed spaces, including automobiles.

Many automobiles are protected both by locks and by intrusion alarms, which are typically activated and deactivated using a small radio or infrared transmitter carried by the car owner as a key-chain fob. Although this type of device is convenient, its loss by the owner may render the vehicle just as vulnerable to theft as if mechanical keys had been used for protection.

Access to automobiles poses some special problems that have not been addressed by presently available security systems. Although fobs are widely used to transmit signals to a car security system, for door access and to activate and deactivate intrusion alarms, once in the car a car owner or user must typically resort to a mechanical key to start the car. Moreover, selection of customized features of the car, such as seat and mirror adjustments, must be made manually, although some cars include a mechanism for memorizing settings of the some of the vehicle's main features.

Accordingly, there is a widely felt need for a more reliable technique for accessing and using automobiles. Ideally, the technique should positively verify the identity of the person seeking access, should provide access to all the car's features, and should eliminate the need to carry multiple keys and fobs, or to memorize combinations or passwords. Another desirable goal is that the technique should operate rapidly enough that it does not significantly delay a person's access to and use of the vehicle. The present invention satisfies all of these needs.

SUMMARY OF THE INVENTION

The present invention resides in apparatus, and a method for its use, for automatically verifying the identity of a person seeking entry to and use of a protected vehicle. Briefly, and in general terms, the apparatus of the present invention comprises a fingerprint sensor mounted in a convenient interior location in a vehicle; a high-speed fingerprint matcher, for comparing a sensed fingerprint image with features of a previously stored reference fingerprint image, to verify the identity of a user of the vehicle; a fingerprint match controller, for selecting from a plurality of stored reference fingerprint images for presentation to the fingerprint matcher, and having a locked mode or operation and an unlocked mode of operation; an engine enabling switch, to prevent operation of the vehicle in the locked mode; means included in the fingerprint match controller, for switching from the locked mode to the unlocked mode upon successfully verifying the identity of a vehicle user; means operable in the unlocked mode, for actuating the engine enabling switch to allow operation of the vehicle; one or more actuators for adjusting vehicle subsystems in accordance with users' preferred settings; storage means for recording actuator settings associated with user identities; and means operable in the unlocked mode, for operating the actuators based on settings retrieved from the storage means for an identified user.

More specifically, the actuators may include a seat adjustment actuator, a mirror actuator, a steering wheel position actuator, a climate control actuator, a mobile telephone actuator, a vehicle performance control actuator, an entertainment device actuator, an airbag setting actuator, and an onboard computer actuator.

The illustrative embodiment of the invention also includes a second fingerprint sensor, mounted in a convenient exterior location on the vehicle. The fingerprint matching controller includes means for determining which fingerprint sensor has been used, and means for unlocking at least one vehicle passenger access door upon verification of the identity of a user placing a finger in the second fingerprint sensor. Preferably, the second fingerprint sensor is located near, or integrated into a door handle, for ease of operation while opening a door of the vehicle.

The apparatus also includes means for switching from the unlocked mode to the locked mode upon detection of engine non-operation for a selected period of time. Thus, the vehicle may be driven, and even restarted after an engine stall, without further identity verification, but will return to the locked mode once the engine has been shut down for a short time, such as a minute or two.

Ideally, the apparatus of the invention also includes a user interface for selection of modes of operation and user identities. An authorized user can speed up the verification process by manually selecting his or her own identity in the user interface, so that only one fingerprint matching operation is needed. An authorized user may also select a new mode of operation at the user interface. The fingerprint match controller will automatically switch to a new selected mode of operation immediately upon verification of the identity of a user.

Among the modes of operation that may be selected by a primary user are a "set" mode that permits enrollment of additional users. For this purpose, the apparatus further comprises means for obtaining and storing reference fingerprint image data pertaining to additional users. Another mode that may be selected is a "guest" mode that permits operation of the vehicle without fingerprint verification. Any enrolled user may request transition to or from the guest mode upon identity verification.

Another mode that may be selected by the primary user of the vehicle is the "combination" mode, which permits operation of the vehicle without fingerprint verification, but using a secret combination.

The apparatus of the invention may also be defined as comprising a fingerprint matching system for verifying the identity of a person who wishes to use the vehicle; an engine enabling switch coupled to the fingerprint matching system, to prevent operation of the vehicle until the identity of the person has been verified; and at least one actuator for adjusting a vehicle subsystem to an individually preferred setting. The fingerprint matching system includes means, operable upon successful verification of a user's identity, for retrieving personal preference data associated with the identified user and for supplying selected personal preference data to the actuator, for automatic adjustment of the vehicle subsystem to the user's preference.

The invention may also be defined in terms of a method for controlling a vehicle using fingerprint identification, the method comprising the steps of sensing a vehicle user's fingerprint image in a fingerprint sensor mounted in a convenient location in the vehicle; selecting from a plurality of previously stored reference fingerprint images of authorized users of the vehicle; comparing the sensed fingerprint image with features of the selected previously stored reference fingerprint image of an authorized user of the vehicle; verifying, in a fingerprint matching system, that the sensed fingerprint image matches the selected reference image; upon verification in the previous step, switching the fingerprint matching system from a locked mode to an unlocked mode and enabling operation of the vehicle; and actuating at least one vehicle subsystem to conform with adjustment settings associated with the identified vehicle user.

The method may further comprise the steps of switching the fingerprint matching system to a guest mode upon verification of an authorized user's fingerprint, wherein any driver may operate the vehicle while in guest mode; and switching the fingerprint matching system back to the unlocked mode upon obtaining another verification of an authorized user. Further steps of the method include sensing when the vehicle engine has been inactive for a prescribed period of time; and then automatically switching the fingerprint matching system back to the locked mode.

The method may also include the steps of switching the fingerprint matching system to a "set" mode if requested by a primary authorized user; and enrolling additional users in the set mode, by analyzing and storing fingerprint features of the additional users. The method may then include unenrolling selected users by removing their stored fingerprint features. Unenrollment of the primary authorized user places the fingerprint matching system in a cleared mode in which no fingerprint matching is needed to operate the vehicle.

In accordance with another feature of the invention, the method further comprises the step of switching the fingerprint matching system to a combination mode if requested by a primary authorized user. Operation of the vehicle in the combination mode does not require fingerprint matching but does require the use of a secret combination. Leaving the combination mode requires the further step of switching the fingerprint matching system from the combination mode to the unlocked mode upon another verification of the primary user's identity in the fingerprint matching system.

Finally, the method may also include the step of recording usage data pertaining to the identified users and selected parameters of vehicle operation.

It will be appreciated from the foregoing that the present invention represents a significant advance in providing secure access to vehicles. More particularly, the invention allows multiple users to gain entry to a vehicle and to have selected vehicle subsystem settings adjusted to personal preferences automatically. Each authorized user enrolls at least one fingerprint in the apparatus of the invention. Then, upon entering or starting the vehicle, an authorized user has only to touch a fingerprint sensor and the vehicle will be automatically adjusted to preferred settings that were saved when the user last operated the vehicle. Other aspects and advantages of the invention will become apparent from the following more detailed description, taken in conjunction with the accompanying drawings.

DESCRIPTION OF THE PREFERRED EMBODIMENTS

As shown in the drawings for purposes of illustration, the present invention pertains to a system for automatic verification of the identity of a person seeking to enter and operate a car. Traditionally, cars are protected by mechanical locks and keys, or by combination locks or electronic devices, such as hand-held fobs.

Figure 1:
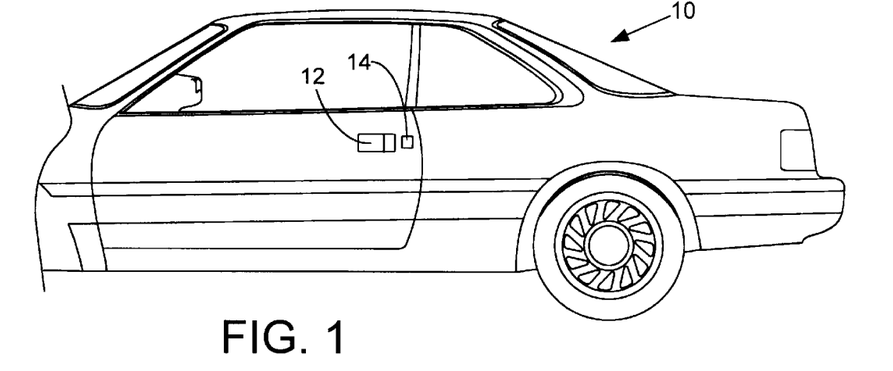
FIG. 1 is a fragmentary elevation view of a car, showing one location of an exterior fingerprint sensor used in the present invention.

In accordance with the present invention, the person seeking access to a car, or wanting to start the car, does so by first placing a finger over a conveniently located sensor. The car user's fingerprint image is employed to control access though the car doors, to unlock the car engine, and to customize a number of car subsystem features automatically to the personal preference of the user. FIG. 1 is an exterior view of part of a car, indicated by reference numeral 10, having a door handle 12 and a fingerprint sensor 14 located adjacent to the door handle. The user gains access to the car 10 by placing a finger, such as the index finger, momentarily on the sensor 14. As will be discussed in more detail, the system of the invention has the ability to verify the identity of the user very rapidly, and to unlock the door (or all doors) upon completion of the verification process.

Figure 2:
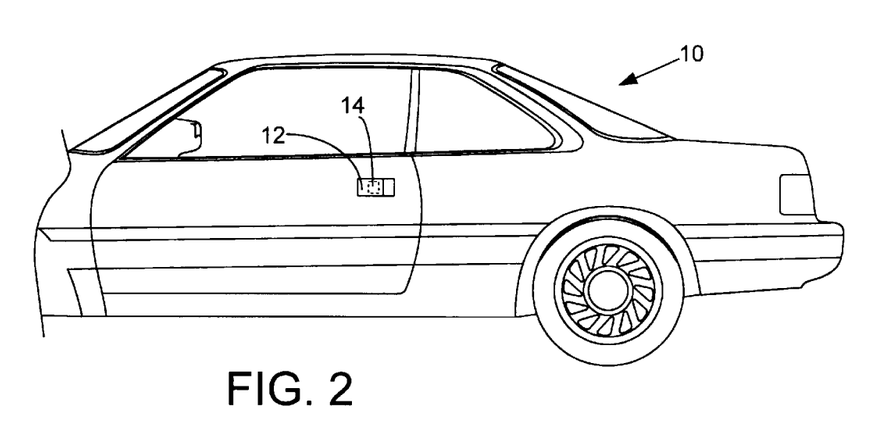
FIG. 2 is a view similar to FIG. 1, but showing an alternative location for a fingerprint sensor, integrated into a door handle.
Figure 3:
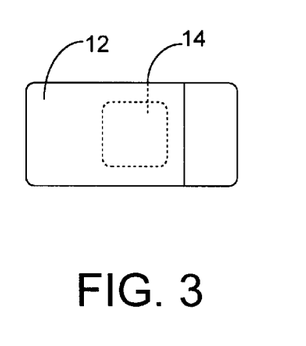
FIG. 3 is an enlarged view of the door handle shown in FIG. 2.

FIG. 2 is similar to FIG. 1, but shows an alternative location for the sensor 14, on the underside of the door handle 12, as best shown in FIG. 3. This approach works best for door handles of the recessed type that have to be pivoted out of a recess by placing a finger beneath the handle and pulling it out.

Figure 4:
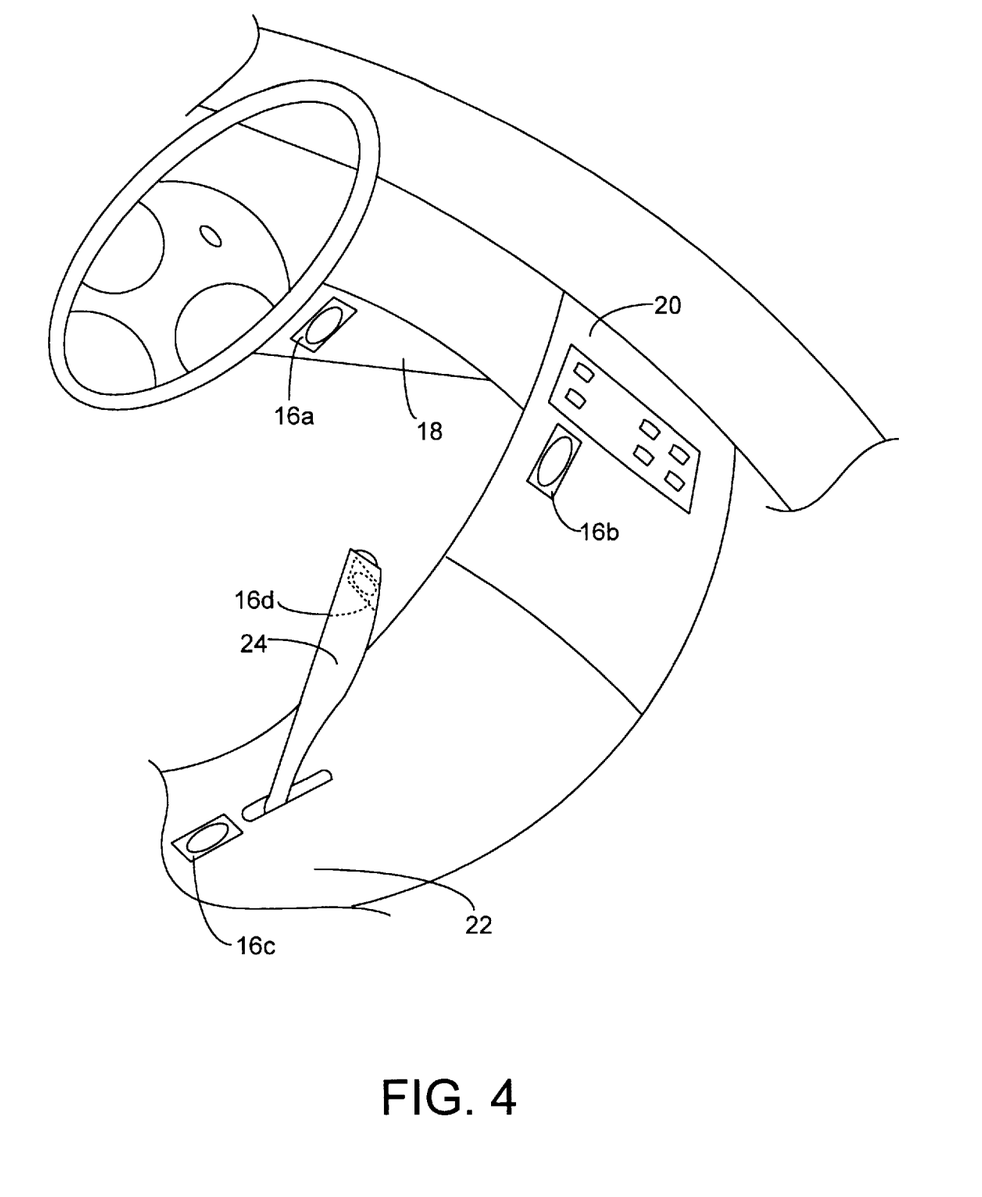
FIG. 4 is a simplified fragmentary perspective drawing of a car interior, showing alternative locations for an interior fingerprint sensor used in the present invention.

FIG. 4 shows four possible locations for an interior sensor 16: (a) near the position of a conventional ignition key switch on the car steering column 18, as indicated at 16a, (b) on the car dashboard 20, such as shown at 16b, (c), on the central console 22, as indicated at 16c, or (d) on a centrally mounted parking brake lever 24, as indicated at 16d.

Figure 5:
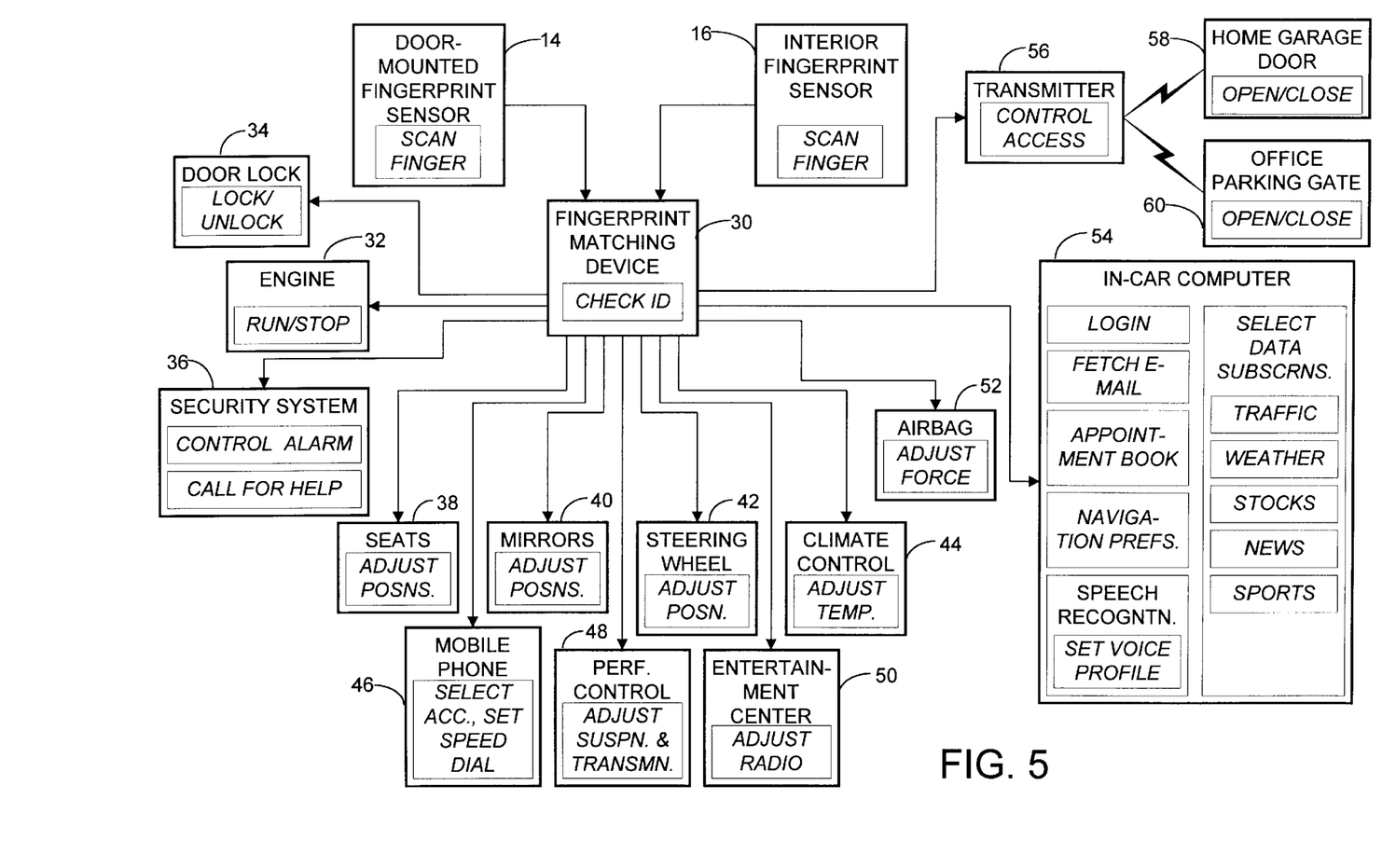
FIG. 5 is a block diagram showing the principal features and functions of the present invention.

FIG. 5 shows the principal functions controlled in association with the fingerprint sensors 14 and 16, both of which are connected to a fingerprint matching device 30 in the car 10. The fingerprint matching device 30 matches the fingerprint image obtained by one of the sensors with one or more internally stored reference fingerprint images obtained from the principal car user and a number of other frequent users who wish to be enrolled to use the car. If a match is determined, the fingerprint matching device 30 transmits control signals to a number of car subsystems. Principal among these subsystems is an engine control switch 32 and a door locking switch 34. It will be understood that, for most cars, the exterior fingerprint sensor 14 will be used to unlock the car and to disable a security system 36, but not to enable the engine control switch 32. One approach for accomplishing a division of functions between the exterior and interior sensors 14 and 16 is further discussed below.

In addition to the more essential functions of engine enabling, door unlocking and control of security alarms, the fingerprint matching device 30 also performs a number of control functions that customize the car for the user whose identity has been verified. Thus, as soon as the driver's identity has been verified through one of the sensors 14 or 16, actuator control signals are transmitted to the car seats 38, mirrors 40, steering wheel 42, climate control 44, mobile telephone 46, vehicle performance controls 48, entertainment center 50, airbag controls 52, in-car computer 54, and radio transmitter 56. The seats, mirrors, steering wheel, climate control and airbag control are adjusted to the settings preferred by the identified user. In the case of the airbag controls 52, adjustment is made on the basis of the user's previously sensed weight, height, or both. These and other adjustments are made on the basis of positional settings that were memorized when the same user last drove the car. Performance controls may include suspension and transmission settings that were either previously selected by the user or were stored after automatically adjusting to the user's weight or other characteristics.

The entertainment center adjustments 50 include preset stations stored by user when previously in the car, and a selection of compact disks or other music media previously selected. If the user is new to the car, no settings will be available but selections made while operating the vehicle will be stored for use when the same user drives on a later occasion. The mobile telephone controls 46 make an appropriate selection of a telephone account for the user, and retrieve a list of speed-dial numbers previously stored by the user.

The radio transmitter controls 56 are used to enable a transmitter for opening a home garage door, as indicated at 58, or an office parking access gate, as indicated at 60. Since each user may have different requirements in this regard, customized frequencies or control signals are stored for each user. Programming these selections into the system is accomplished either by manually entering the data or by utilizing a "training" mode in which signals from each user's separate garage door opener and parking gate opener or transponder are captured and analyzed.

If the car has an onboard computer 54, the user's verified identity may be used to log in automatically, to fetch any electronic mail (e-mail), to retrieve the user's appointment book, navigation system preferences, and speech profile (to condition the computer to accept voice commands from the user). The user's personal preferences for subscription data services may also be initialized in the computer, such as data subscriptions to services pertaining to traffic, weather, stocks, news, or sports.

Figure 6:
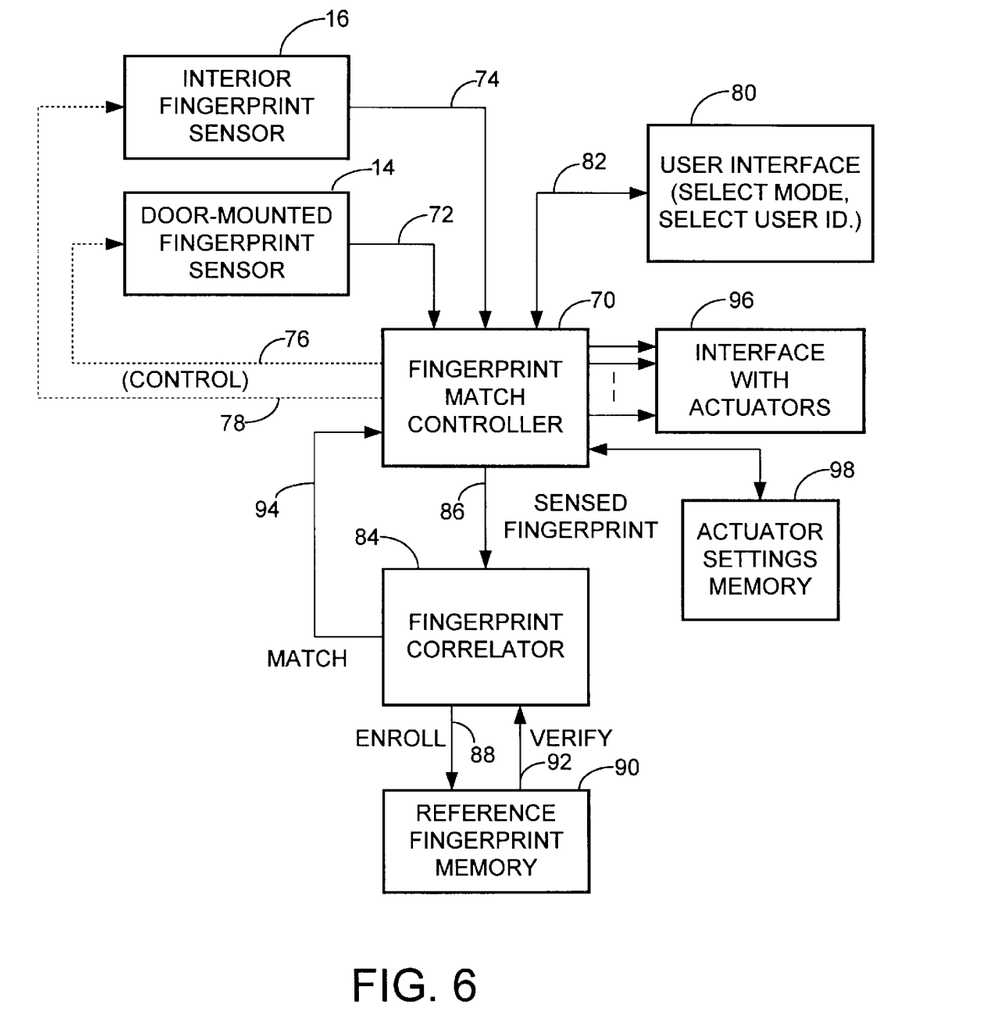
FIG. 6 is block diagram showing a fingerprint match controller and other hardware components of the present invention.

FIG. 6 shows the principal hardware components of the fingerprint checking device 30. The fingerprint sensors 14 and 16 interface with a fingerprint match controller 70, the structure and function of which will be described with reference to FIGS. 7–9. The controller 70 receives fingerprint image data over lines 72 and 74 from the sensors 14 and 16, and transmits control signals to the sensors over lines 76 and 78, respectively. The fingerprint matching device 30 also includes a user interface 80, which is coupled to the controller 70 over lines 82. The specific structure of the interface 80 is not critical to the invention. It may, for example, include a small display screen and a control panel for the selection of a mode of operation and an enrolled user name. As will be discussed with reference to FIG. 7, a user may select a mode of operation on the user interface 80, and then render that mode active by placing a finger on one of the sensors 14 and 16 for identity verification.

An important component of the fingerprint matching device 30 is a fingerprint correlator 84. In an enroll mode of correlator operation, the sensed fingerprint image, on line 86, is processed to extract distinctive features of the image, which are transmitted over line 88 to a reference fingerprint memory 90. In a verification mode of operation, the correlator 84 compares a fingerprint image received over line 86 with the fingerprint features stored in the memory 90 and transmitted to the correlator over line 92. The result of the correlation process is simply a match or no-match signal on line 94, which is coupled back to the fingerprint match controller 70.

The fingerprint correlator 84 performs the matching function very rapidly by using special-purpose hardware in the form of an application-specific integrated circuit (ASIC), which employs a high degree of parallel processing to search an entire fingerprint image for instances of distinctive reference features that have been previously stored in the memory 90. A specific form of the fingerprint correlator that can achieve the desired speed of matching is disclosed in a patent application by Bruce W. Evans et al., entitled "Fingerprint Feature Correlator," filed concurrently with this application. The Evans et al. patent application is hereby incorporated by reference into this specification. A correlator constructed in accordance with the principles described in the Evans et al. specification is capable of verifying a user's identity in less than a second, and closer to half a second if only one reference fingerprint image has to be compared with a sensed fingerprint image. The matching process can be easily arranged such that, in most cases, only one comparison is needed, since the user's identity is usually known in advance.

When a user's identity has been verified by the fingerprint correlator 84, the fingerprint match controller 70 issues appropriate commands to an interface 96 with various actuators and controls described with reference to FIG. 5. Actuator settings are retrieved from a memory 98 and used to generate these commands.

Figure 7:
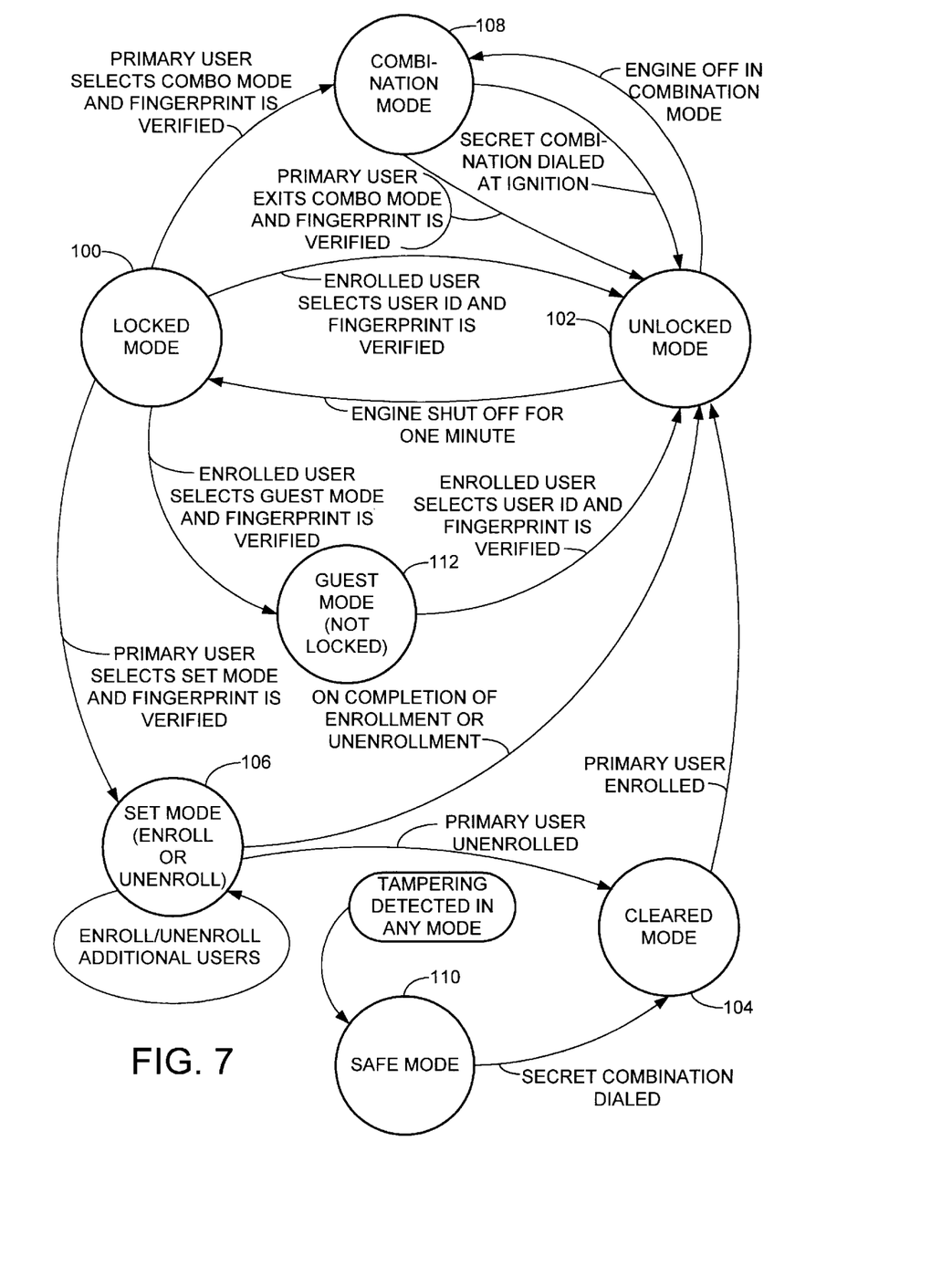
FIG. 7 is a state diagram depicting the various modes of operation of the fingerprint match controller of FIG. 6, and showing the conditions needed to effect transitions between different pairs of modes.

The structure and operation of the fingerprint match controller 70 is best illustrated in the form of a state diagram, as shown in FIG. 7. The state diagram shows (as circles) the principal operational modes or states of the controller 70 and the conditions needed to effect transfers from one state to another. The conditions are described in text associated with each transition line from one state to another. The two principal states of the controller 70 are the locked mode 100 and the unlocked mode 102. In the locked mode, the car's conventional ignition key switch (not shown) is disabled by another, series-connected, switch controlled by the fingerprint matching device. In the locked mode, the doors may be either locked or unlocked. The car cannot bestarted in the locked mode 100 until the identity of an enrolled user is verified by the system. In the unlocked mode 102, the engine or ignition switch is enabled and the engine may be started by turning the ignition key or other device used for this purpose. To make the transition from locked to unlocked mode, a user first selects his or her enrolled identity on the user interface 80, and then places a finger over the interior sensor 16. If the exterior sensor 14 is used, the user cannot access the user interface, and simply places a finger over the sensor to unlock the car and transition to the unlocked mode, but without the ability to start the car. As previously mentioned, enabling starting the car still requires use of the interior sensor 16, but other user customization functions may be initiated from the external sensor 14. Employing the user interface 80 to specify a user identity potentially speeds up the verification process because the fingerprint match controller 70 does not have to search through multiple reference fingerprint images to find one that matches this user.

In the unlocked mode 102, the car may be started and driven, and the various customization functions are performed to prepare the car for driving by the identified user. Transition back to the locked mode 100 occurs when the engine has been shut off for some short period, such as a minute or two. Thus, temporary engine stalls do not prevent the user from driving the vehicle.

When a car is first purchased, it is delivered in a "cleared" mode 104, in which the engine controls are not locked and the car may be driven and delivered using a conventional ignition key. When a first user is enrolled, that user is designated the primary user. His or her fingerprint features are stored as the primary user's and the controller 70 assumes the unlocked mode 102. Enrollment includes the recording of the fingerprints of two fingers, preferably the index and ring fingers of the right hand. The second fingerprint serves as a back-up feature, for use if a finger is injured or, for some reason, is ineffective in attempting to access or drive the car.

The primary user may enroll others to be authorized to drive the car. The enrollment process is started by selecting a "set" mode in the user interface and having the primary user place his or her finger on the sensor. In the set mode 106, other users, such as family members of the primary user, may have their fingerprints analyzed and recorded. Users may also be unenrolled in the set mode of operation. After enrollment, any of these additional users may enter and start the car with the same authority as the primary user. The primary user, however, has some additional powers that the additional users do not have. The primary user may select a combination mode 108 in the user interface 80 and, after fingerprint verification of the primary user, the controller 70 enters the combination mode. In this mode, which is useful for granting temporary, but still secured, access to an unenrolled driver, the unlocked mode 102 can only be reached by dialing a secret combination at the ignition switch. The primary user can disable the combination mode 108 and go to the unlocked mode 102, upon fingerprint verification, and can also change the secret combination (not shown in FIG. 7).

The primary user is also the only one who can enter the set mode 106 and the only one who can enter the cleared mode 104.

For additional security, there is a "safe" mode 110, which is entered upon detection of tampering in any mode of operation. The safe mode is also a locked mode. Exit from the safe mode 110 may be made only upon dialing a secret combination, which effects a transition to the cleared mode 104.

Finally, there is a "guest" mode of operation 112, which is similar in some respects to the unlocked mode 102. More precisely, guest mode is one that enables conventional operation with an ignition key. There is no reversion to locked mode when the engine is shut off, and no customized user features are retrieved or stored while the guest is driving. Guest mode is appropriate when handing over the car to a valet parking attendant or to a garage mechanic. Any enrolled user may enter guest mode by selecting the mode on the user interface 80 and having his or her fingerprint verified. Guest mode is turned off by selecting a user identity on the user interface 80 and having the user fingerprint verified.

Figure 8:
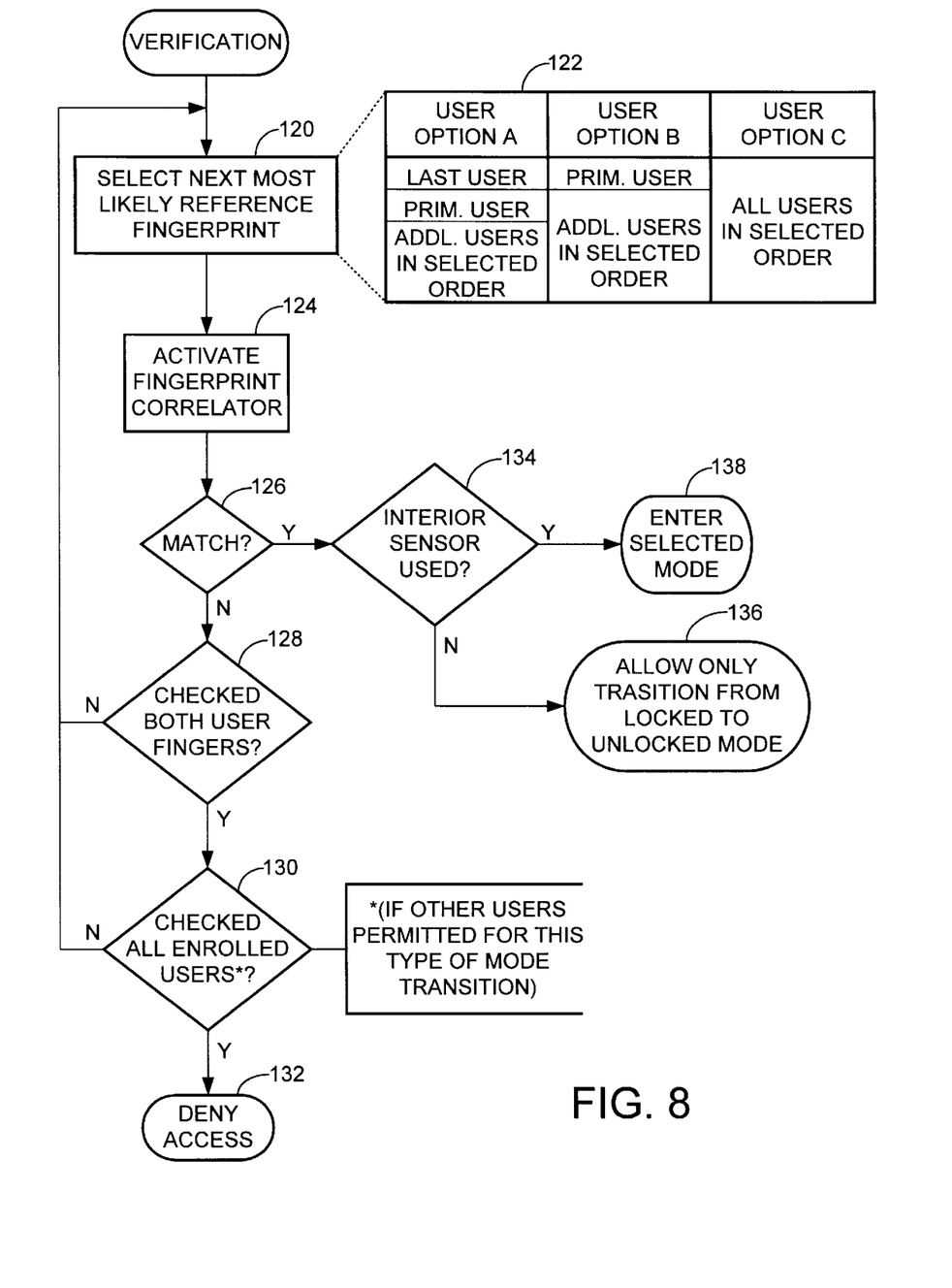
FIG. 8 is a flowchart showing functions performed by the fingerprint match controller during verification of a fingerprint image.

The process of identity verification, as performed by the fingerprint match controller 70, is defined by the flowchart of FIG. 8. The first step, as indicated in block 120, is to select the next most likely reference fingerprint to compare with the one being sensed. If the user interface 80 is set to a specific user identity, then that identity is used to access the reference data stored in the memory 90. If no identity is specified by the user interface 80, either because the exterior sensor 14 is being used, or the user has not correctly adjusted the interface, or the system does not make use of the user interface, then the next most likely fingerprint is selected as indicated in table 122. Any of various user options may be used to obtain a fingerprint preference list. In option A, the verification process first selects the last user's reference fingerprint data. If no match is found, the process selects the primary user's reference fingerprint data, if that, too, does not produce a match, additional users' reference fingerprint data are selected in a sequence that may be specified by the principal user. In option B, the primary user's fingerprint data are the first choice and the previous user's identity is ignored. In option C, the primary and last users' identities are both ignored and all users are scanned in a selected sequence. When a reference fingerprint has been selected, the fingerprint correlator is activated, as indicated in block 124, using the selected reference data and the fingerprint image obtained from one of the sensors 14 and 16.

In most cases, verification will accomplished in the shortest possible time because the identity of the user is already known, either because the user selects his or her name in the user interface 80 before verification, or because the user is the principal user or the last user of the vehicle. When a new user approaches the vehicle and seeks entry using the exterior fingerprint sensor 14, there may be a slight delay while multiple comparisons are performed, but the delay will be avoided once the new user has entered the vehicle and adjusted the user interface 80 to reflect his or her identity.

If the fingerprint correlator 84 (FIG. 6) does not find a match, as determined in decision block 126, the verification process may be repeated using reference data from a different fingerprint of the same person. If this is done without success, as determined in decision block 128, the process may be repeated again using reference fingerprint data from other persons, in accordance with one of the options shown in table 122. For some applications of the verification process, only the primary user may participate, in which case, there will be no need to attempt verification using other enrolled users' fingerprint reference data. In any event, when all permissible fingerprint reference data have been checked, as determined in decision block 130, access will be denied, as indicated in terminal block 132.

When a match is determined by the correlator 84, as discovered in decision block 126, a further distinction is made if the exterior sensor 14 was used in the verification process. As presently contemplated, the invention does not permit all types of mode transitions to be effected from the exterior sensor 14. Thus, if decision block 134 determines that the exterior sensor 14 was used, only a transition from the locked mode 100 to the unlocked mode 102 will be permitted, as indicated in terminal block 136, and access will be denied for other purposes. If the interior sensor 16 is used, the selected mode will be entered, as indicated in terminal block 138.

Figure 9:
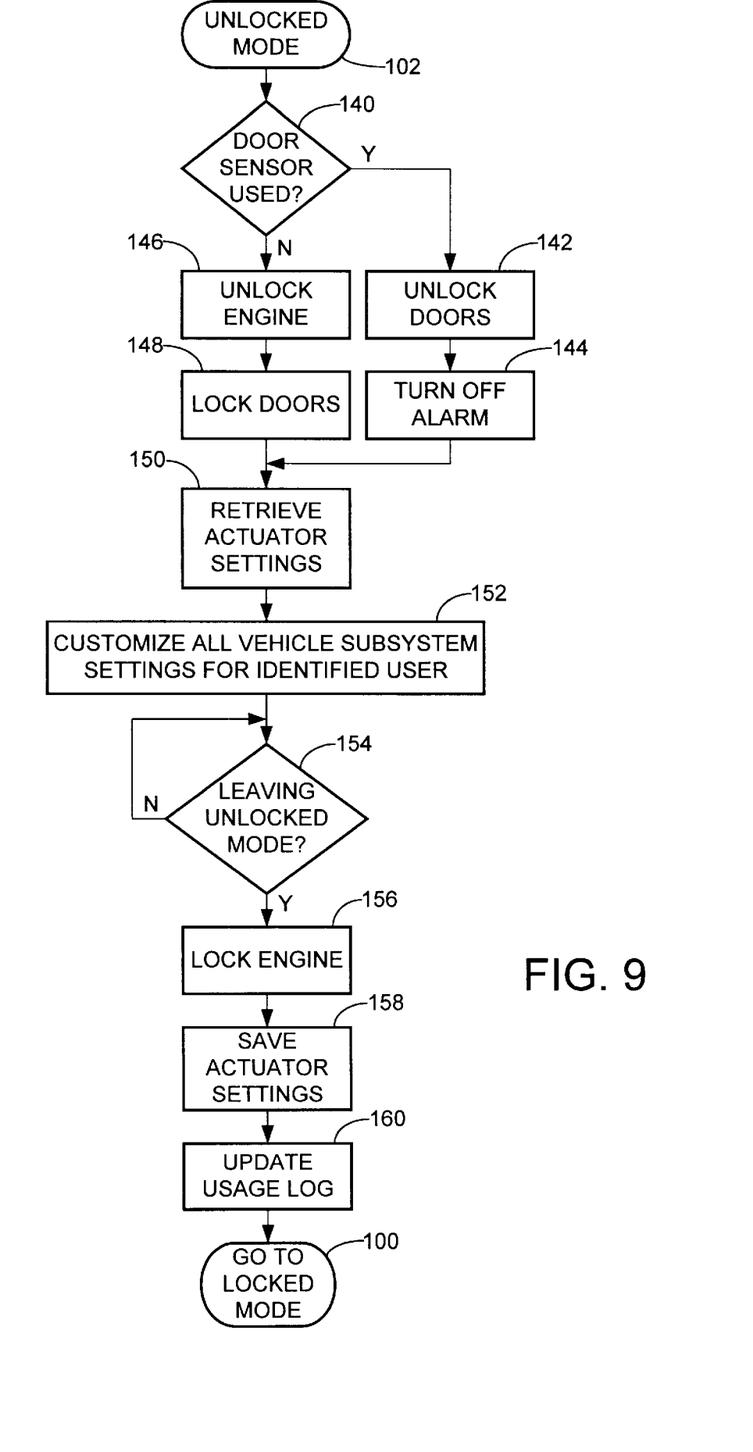
FIG. 9 is a flowchart showing functions performed by the fingerprint match controller in an unlocked mode of operation.

When entering the unlocked mode 102, the functions performed are those illustrated in FIG. 9. First, a distinction is again made between functions initiated from the exterior or door sensor 14 and those initiated from the interior sensor 16, as determined in decision block 140. When the door sensor 14 is used, the controller 70 automatically unlocks the doors, as indicated in block 142, and turns off the alarm system, as indicated in block 144. If the unlocked mode is entered when the user is in the car, the first step is to unlock the engine, as indicated in block 146, and, optionally, to lock the doors, as indicated in block 148. Then, regardless of which sensor was used, the controller 70 retrieves actuator settings from memory 98 (FIG. 6), as indicated in block 150, and customizes all vehicle subsystem settings for the identified user, as indicated in block 152. Thus, all of the user's personal settings are conveniently restored when the driver enters or starts the car. The controller 70 remains in the unlocked mode and enters a "sleep" status temporarily, at least as far as the user interface is concerned.

As indicated in decision block 154, the controller 70 in the unlocked mode is continually checking for departure from this mode. This is typically initiated by engine shut-off for a selected time period, such as a minute. If this event is detected, the engine is locked, as indicated in block 156, and all actuator settings are saved in memory 90 (FIG. 6), as indicated in block 158. Finally, a usage log is updated, as indicated in block 160 and the locked mode 100 is entered. The usage log is a maintained record of car usage on a user-by-user basis. Similar to a flight recorder on an aircraft, the usage log records selected vehicle parameters and the times of use by each user. Optionally, the usage log may record speed, distance driven, fuel consumed and other performance data obtained from an engine computer in the car.

It will be appreciated from the foregoing that the present invention represents a significant advance in the field of secured access to cars and other vehicles. In particular, the invention conditions access and use of a car on successful identity verification using fingerprint images. Moreover, once a user's identity is verified, a full range of convenience features of the car are automatically adjusted to the user's personal preferences. It will also be appreciated that, although a specific embodiment of the invention has been described in detail for purposes of illustration, various modifications may be made without departing from the spirit and scope of the invention. For example, it will be apparent that the principles of the invention may be easily adapted for use in a vehicle that uses a different biometric feature of the human body for identification purposes. The invention should not, therefore, be limited except as by the accompanying claims.

What is claimed is:

1. Apparatus for controlling a vehicle using fingerprint matching, the apparatus comprising:
   a fingerprint sensor mounted in a convenient interior location in a vehicle, for generating a two-dimensional fingerprint image of a user of the vehicle;
   a high-speed fingerprint matcher, for searching the entire two-dimensional sensed fingerprint image for instances of distinctive features similar to each of a plurality of pattern features that have been extracted from a previously stored reference fingerprint image, to verify the identity of the user of the vehicle;
   a fingerprint match controller, for selecting from a plurality of stored reference fingerprint images for presentation tb the fingerprint matcher, and having a locked mode of operation and an unlocked mode of operation;
   an engine enabling switch, to prevent operation of the vehicle in the locked mode;
   means included in the fingerprint match controller, for switching from the locked mode to the unlocked mode upon successfully verifying the identity of a vehicle user;
   means operable in the unlocked mode, for actuating the engine enabling switch to allow operation of the vehicle;
   at least one actuator for adjusting a vehicle subsystem in accordance with the user's preferred settings;
   storage means for recording actuator settings associated with user identities; and
   means operable in the unlocked mode, for operating the actuator based on settings retrieved from the storage means for an identified user.

2. Apparatus as defined in claim 1, wherein the at least one actuator is selected from the group comprising: a seat adjustment actuator, a mirror actuator, a steering wheel position actuator, a climate control actuator, a mobile telephone actuator, a vehicle performance control actuator, an entertainment device actuator, an airbag setting actuator, and an onboard computer actuator.

3. Apparatus as defined in claim 1, and further comprising:
   a second fingerprint sensor, mounted in a convenient exterior location on the vehicle; and
   means for determining which fingerprint sensor has been used; and
   means included in the fingerprint match controller, for unlocking at least one vehicle passenger access door upon verification of the identity of a user placing a finger in the second fingerprint sensor.

4. Apparatus as defined in claim 3, wherein the second fingerprint sensor is integrated into a door handle, for operation while opening a door of the vehicle.

5. Apparatus as defined in claim 1, and further comprising:
   means included in the fingerprint match controller, for switching from the unlocked mode to the locked mode upon detection of engine non-operation for a selected period of time.

6. Apparatus as defined in claim 1, and further comprising:
   a user interface for selection of modes of operation and user identities; and
   means included in the fingerprint match controller, for switching to a new selected mode of operation upon verification of the identity of a user.

7. Apparatus as defined in claim 6, wherein:
   the selected mode is a "set" mode that permits enrollment of additional users; and
   the apparatus further comprises means included in the fingerprint match controller, for obtaining and storing reference fingerprint image data pertaining to additional users.

8. Apparatus as defined in claim 6, wherein:
   the selected mode is a "guest" mode that permits operation of the vehicle without fingerprint verification; and
   any enrolled user can request transition to and from the guest mode upon identity verification.

9. Apparatus as defined in claim 6, wherein:
   the selected mode is a "combination" mode that permits operation of the vehicle with a secret combination; and
   only one user can request transition to and from the combination mode.

10. Apparatus for controlling a vehicle using fingerprint matching, the apparatus comprising:
- a first fingerprint sensor mounted in a convenient interior location in a vehicle, for generating a two-dimensional fingerprint image of a user of the vehicle;
- a second fingerprint sensor mounted in a convenient exterior location of the vehicle, for generating a two-dimensional fingerprint image of a user of the vehicle;
- a high-speed fingerprint matcher, for searching the entire two-dimensional sensed fingerprint image for distinctive features similar to each of plurality of pattern features that have been extracted from a previously stored reference fingerprint image, to verify the identity of the user of the vehicle;
- means for storing selected, features of a plurality of reference fingerprint images obtained from enrolled users of the vehicle;
- a fingerprint match controller, for selecting from the plurality of stored reference fingerprint images for presentation to the fingerprint matcher, and having a locked mode of operation and an unlocked mode of operation;
- an engine enabling switch, to prevent operation of the vehicle in the locked mode;
- means included in the fingerprint match controller, for switching from the locked mode to the unlocked mode upon successfully verifying the identity of a vehicle user whose fingerprint is sensed;
- means operable in the unlocked mode, for actuating the engine enabling switch to allow operation of the vehicle if the fingerprint was sensed by the first fingerprint sensor; and
- means operable in the unlocked mode, for unlocking at least vehicle door if the fingerprint was sensed by the second fingerprint sensor.

11. Apparatus as defined in claim 10, and further comprising:
- at least one actuator for adjusting a vehicle subsystem to meet a user's preferences;
- storage means for recording actuator settings associated with user identities; and
- means operable in the unlocked mode, for operating the at least one actuator in accordance with actuator settings retrieved from the storage means for an identified user.

12. Apparatus as defined in claim 11, wherein the at least one actuator is selected from the group comprising: a seat adjustment actuator, a mirror actuator, a steering wheel position actuator, a climate control actuator, a mobile telephone actuator, a vehicle performance control actuator, an entertainment device actuator, an airbag setting actuator, and an onboard computer actuator.

13. Apparatus as defined in claim 10, and further comprising:
- means included in the fingerprint match controller, for switching from the unlocked mode to the locked mode upon detection of engine non-operation for a selected period of time.

14. Apparatus as defined in claim 10, and further comprising:
- a user interface for selection of modes of operation and user identities; and
- means included in the fingerprint match controller, for switching to a new selected mode of operation upon verification of the identity of a user.

15. Apparatus as defined in claim 14, wherein:
- the selected mode is a "set" mode that permits enrollment of additional users; and
- the apparatus further comprises means included in the fingerprint match controller, for obtaining and storing reference fingerprint image data pertaining to additional users.

16. Apparatus as defined in claim 14, wherein:
- the selected mode is a "guest" mode that permits operation of the vehicle without fingerprint verification; and
- any enrolled user can request transition to and from the guest mode upon identity verification.

17. Apparatus as defined in claim 14, wherein:
- the selected mode is a "combination" mode that permits operation of the vehicle with a secret combination; and
- only a principal user can request transition to and from the combination mode.

18. A method for controlling a vehicle using fingerprint identification, the method comprising the steps of:
- generating a two-dimensional fingerprint image of a vehicle user, from data obtained from a fingerprint sensor mounted in a convenient location in the vehicle;
- selecting from a plurality of previously stored reference fingerprint images of authorized users of the vehicle;
- comparing the entire two-dimensional generated fingerprint image with each of a plurality of features of the selected previously stored reference fingerprint image of an authorized user of the vehicle;
- verifying, in a fingerprint matching system, that the sensed fingerprint image matches the selected reference image;
- upon verification in the previous step, switching the fingerprint matching system from a locked mode to an unlocked mode and enabling operation of the vehicle; and
- actuating at least one vehicle subsystem to conform with adjustment settings associated with the identified vehicle user.

19. A method as defined in claim 18, and further comprising the steps of:
- switching the fingerprint matching system to a guest mode upon verification of an authorized user's fingerprint, wherein any driver may operate the vehicle while in guest mode; and
- switching the fingerprint matching system back to the unlocked mode upon obtaining another verification of an authorized user.

20. A method as defined in claim 18, and further comprising the steps of:
- sensing when the vehicle engine has been inactive for a prescribed period of time; and then
- automatically switching the fingerprint matching system back to the locked mode.

21. A method as defined in claim 18, and further comprising the steps of:
- switching the fingerprint matching system to a "set" mode if requested by a primary authorized user; and
- enrolling additional users in the set mode, by analyzing and storing fingerprint features of the additional users.

22. A method as defined in claim 21, and further comprising the step of:
- unenrolling selected users by removing their stored fingerprint features.

23. A method as defined in claim 22, wherein unenrollment of the primary authorized user places the fingerprint matching system in a cleared mode in which no fingerprint matching is needed to operate the vehicle.

24. A method as defined in claim 18, and further comprising the step of:

switching the fingerprint matching system to a combination mode if requested by a primary authorized user, wherein operation of the vehicle in the combination mode requires the entry of a secret combination.

25. A method as defined in claim 24, and further comprising the step of:

switching the fingerprint matching system from the combination mode to the unlocked mode upon another verification of the primary user's identity in the fingerprint matching system.

26. A method as defined in claim 18, and further comprising the step of:

recording usage data pertaining the identified user and selected parameters of vehicle operation.

* * * * *